Sept. 23, 1924.
A. J. CECIL
STAKE HOLDER
Filed March 26, 1924
1,509,229
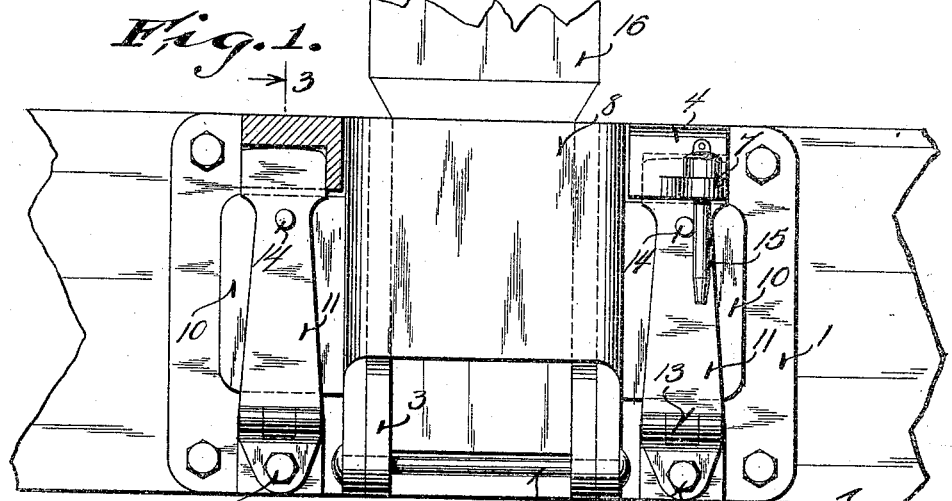
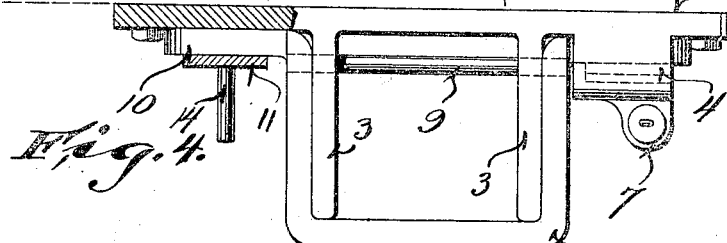
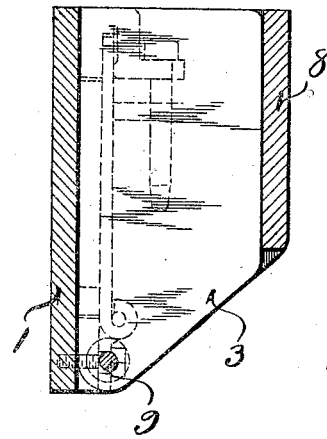
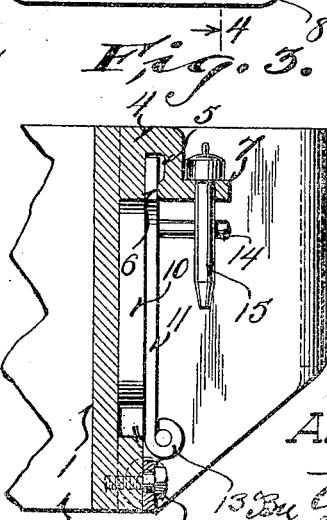
Inventor:
Augustine J. Cecil Inventor:
Henry P. Corbin

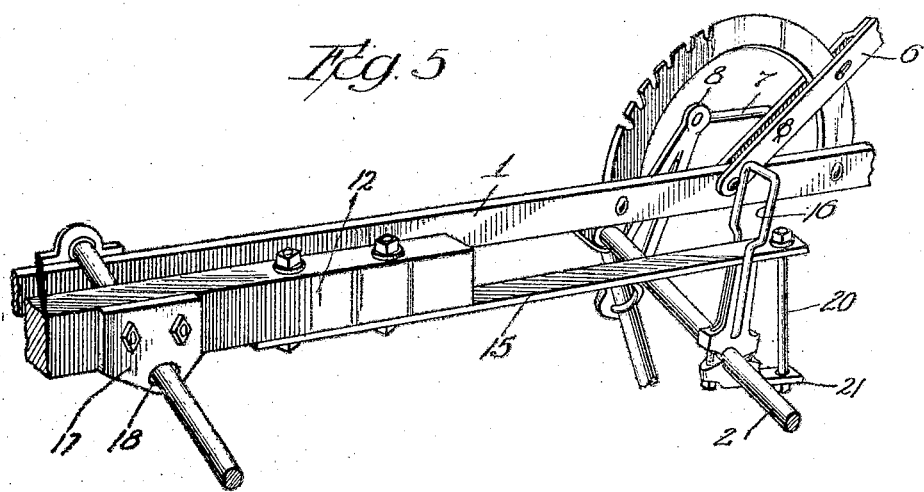
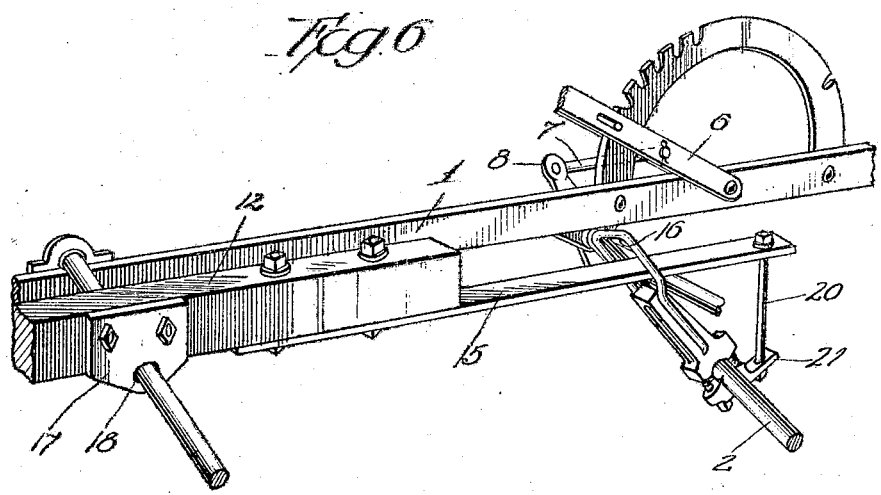

Patented Sept. 23, 1924.

1,509,230

UNITED STATES PATENT OFFICE.

HENRY P. CORBIN, OF MOLINE, ILLINOIS, ASSIGNOR TO MOLINE PLOW COMPANY, INCORPORATED, OF MOLINE, ILLINOIS, A CORPORATION OF VIRGINIA.

IMPLEMENT POLE CONNECTION.

Application filed September 22, 1922. Serial No. 589,756.

*To all whom it may concern:*

Be it known that I, HENRY P. CORBIN, a citizen of the United States, residing at Moline, county of Rock Island, State of Illinois, have invented certain new and useful Improvements in Implement Pole Connections, of which the following is a specification.

The invention relates to implement pole connections.

It relates particularly to pole connections for use with pullers such as shown in the co-pending application of Hugo T. Lindgren, Serial No. 536,100, filed February 13, 1922.

The general object of the invention is to provide an improved connection for automatically locking a guiding pole to an implement under certain conditions and for automatically releasing it under other conditions.

A more specific object is to provide an improved and simplified pole connection for a beet puller.

Other objects will herein after appear.

An embodiment of the invention is illustrated in the drawings, in which,

Figure 1 is a side elevation of a beet puller embodying the invention.

Figure 2 is a perspective view of the connection betwen the pole and the crank axle.

Figure 5 is a perspective of a modified form with the parts shown in the position they occupy when the beet puller is raised.

Figure 6 is a perspective of the mechanism shown in Figure 5 with the parts in the position they occupy when the beet puller is lowered.

Figure 3:
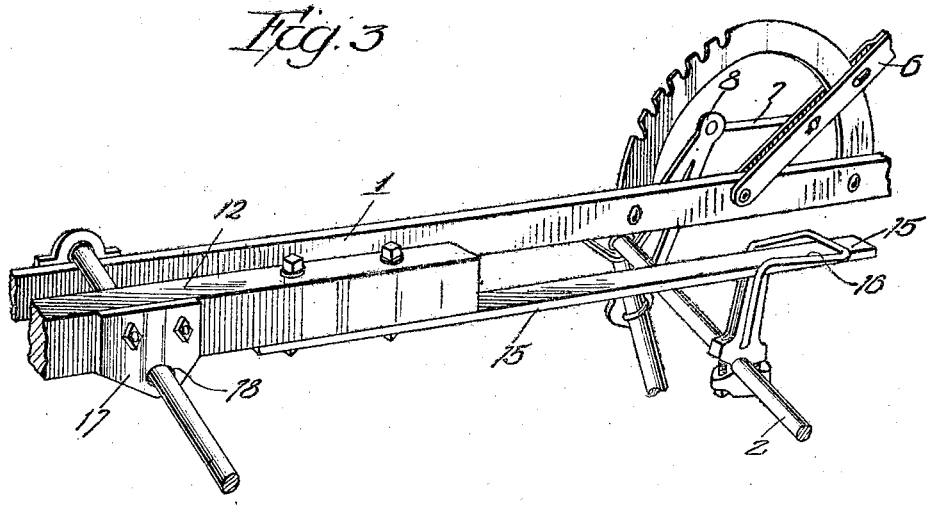
Figure 3 is a perspective of a portion of the mechanism showing a slightly modified form, the beet puller being shown in raised position.

The machine comprises, in general, a frame 1 supported by a crank axle 2 which carries ground wheels 3 only one of which is shown. Adjustably secured to the frame are arms 4 carrying beet puller tools 5. The machine is raised and lowered by swinging the crank axle 2 by means of a lever 6 pivoted to the frame and connected by a link 7 with a bracket 8 on the crank axle. A pair of steering wheels 9, only one of which is shown, are journaled at the forward end of the frame and arranged to be steered through links 10 and a foot lever 11. When the machine is raised, these steering wheels are off the ground, at which time, the tongue 12 is used for steering the machine, but, when the machine is lowered, the steering wheels are in contact with the ground and guide the machine, at which time, the tongue 12 is free to move laterally and is inactive as a guiding means.

The present invention is directed particularly to the automatic means for insuring that the tongue 12 will be rigid with the machine when the latter is raised so that the tongue may be used as a guiding means and for insuring that the tongue will be free to move laterally when the machine is lowered so that the steering wheel may be used for guiding purposes.

In order to accomplish this result a bar 15 is connected to and extends rearwardly from a tongue 12. This bar extends through an opening in a loop 16 fixed to the crank axle 2. This loop member is bent at an angle as illustrated in Figure 2 and the opening in it is narrow at one end and wide at the other.

Figure 4:
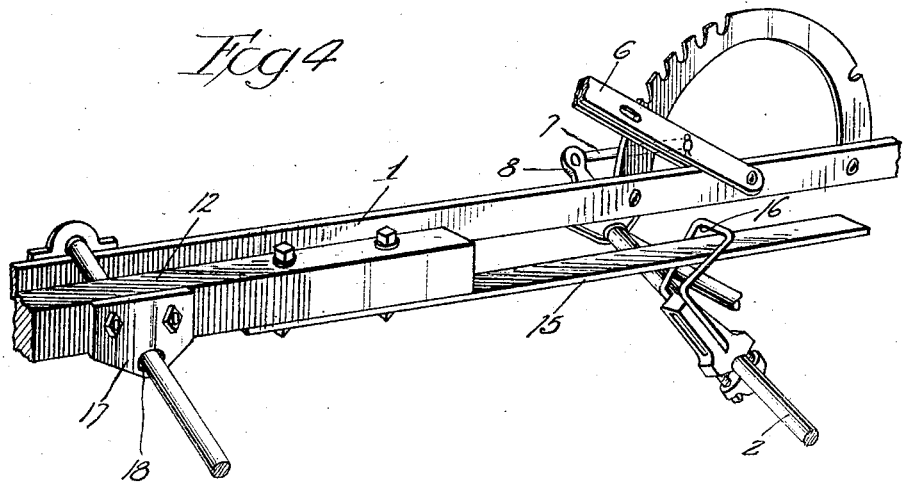
Figure 4 is a perspective of the mechanism illustrated in Figure 3, with the parts in the position they occupy when the puller is lowered.

The manner in which this mechanism operates will be clear by referring to Figures 3 and 4, in which the construction shown is slightly modified from that illustrated in Figures 1 and 2, but the operation of which is the same. The loop member 16 moves with the crank axle 2 and when the machine is lowered it occupies the position illustrated in Figure 4. When in this position, the bar 15 is positioned at the upper or wide part of the opening in the loop and, consequently, the bar is free to move to a limited extent sidewise. The pivot 17 of the tongue 12 to the frame of the machine is such as to permit the tongue to move in a horizontal plane. In the construction shown this result is by making a hole 18 in the bearing slightly oblong as illustrated in Figures 3 and 4. When the parts are in this position, the tongue 12 can move freely to a limited extent in a horizontal plane. The extent of this movement, can, of course, be varied by varying the size of the opening in the loop 16 and the character of the mounting of the tongue on the frame. It is not necessary that the tongue swing through a wide arc but simply that it be sufficiently free so that, when the machine is lowered, the guiding will be performed by the steering wheels without interference from the tongue.

When the machine is raised, the parts occupy the position shown in Figure 3 in which the bar 15 is in the neck or narrow portion in the loop. Sidewise movement of the bar is thus prevented and consequently the tongue is connected rigidly to the frame of the machine so that it acts as a guiding member. It acts as the only guiding means since the steering wheels are, in this position of the parts, off the ground and inactive.

As the parts move from the position shown in Figure 4, to that of Figure 3, the bent end of the loop contacts with the end of bar 15 forcing it downwardly into the neck of the loop against any tendency of the weight of the pole to raise it.

The modification illustrated in Figures 5 and 6 operates in the same general manner as the form hereinbefore described. In this modification, the loop 16 is not bent. In order to insure that the bar 15 will move in proper relation to the loop member, it is connected by a link 20 with an arm 21 forming a part of the bracket connecting the loop to the crank axle. This link prevents the bar from moving upwardly from the position shown in Figure 5, that is, it prevents the front end of the tongue from moving downwardly so as to cause the bar 15 to move into the wider portion of opening in the loop member. In the modification previously described, this action is prevented by the bar contacting the end of the loop, the loop being bent for that purpose. The connection of the link 20 to the bar 15 and the arm 21 is loose so that it does not prevent these parts from moving toward one another.

It is to be understood that the construction is for purposes of illustration only and that modifications may be made in it without departing from the spirit and scope of the invention.

I claim:

1. In an implement, a pole mounted to swing in both horizontal and vertical planes, an oscillatable shaft, and means carried by the shaft cooperating with the end of the pole and serving to prevent the pole from swinging in a horizontal plane when the shaft is in one position, but permitting a limited swinging movement when the shaft is in another position.

2. In an implement, a pole mounted to swing in both horizontal and vertical planes, an oscillatable shaft, and meas carried by the shaft cooperating with the end of the pole serving to prevent the pole from swinging in a horizontal plane when the shaft is in one position and, when the shaft is in another position, permitting a limited movement in a horizontal plane, but preventing the pole from swinging downward.

3. In an implement, a pole mounted to swing in both vertical and horizontal planes, an oscillatable shaft, and a loop member carried by the shaft serving to prevent the pole from swinging in a horizontal plane when the shaft is in one position and serving, when the shaft is in another position, to hold the end of the pole against vertical movement in one direction, but permitting a limited amount of horizontal movement.

4. In an implement, a guiding pole mounted to move in both horizontal and vertical planes, a swinging crank axle for raising and lowering the implement, and means carried by the crank axle cooperating with the end of the pole for automatically locking the pole to the machine when the machine is raised and for automatically releasing it to permit the pole to move laterally relative to the machine when the machine is lowered.

5. In an implement, a guiding pole mounted to move in both horizontal and vertical planes, a crank axle, means for swinging the crank axle to raise and lower the implement, and an angular loop carried by the crank axle and cooperating with the end of the tongue for automatically locking the tongue rigidly to the implement when it is raised and for automatically releasing the tongue to permit it to move relative to the implement when the implement is lowered.

6. A beet puller having a laterally movable pole, pivotal connections for raising and lowering the puller, and means carried by the pivotal connections cooperating with the pole for automatically locking the pole to the machine when it is raised and for automatically freeing the pole to permit it to move relative to the machine when the machine is lowered.

7. A beet puller having a laterally movable pole, a crank axle, means for swinging the crank axle to raise and lower the puller, and means carried by the crank axle cooperating with the pole for automatically locking the pole rigidly to the machine when the machine is raised and for automatically releasing the pole to permit it to move laterally relative to the machine when the machine is lowered.

8. A beet puller having a laterally movable pole, a crank axle, means for swinging the crank axle to raise and lower the beet puller, and an angular loop carried by the crank axle cooperating with the end of the pole to automatically lock the pole rigidly to the machine when it is raised and to automatically release the pole to permit it to move laterally relative to the machine when the machine is lowered.

9. A beet puller having steering wheels, a crank axle, means for swinging the crank axle to raise and lower the puller, the steering wheels being mounted so as to be out of contact with the ground when the machine is raised, a guiding pole mounted to move laterally relative to the puller, and means carried by the crank axle cooperating with the end of the pole for automatically locking the tongue rigidly to the puller when the latter is raised and for automatically freeing the pole to render it inoperative as a guiding means when the puller is lowered.

In testimony whereof, I affix my signature.

HENRY P. CORBIN.